No. 709,289. Patented Sept. 16, 1902.
J. H. YOUNG.
MERIDIAN ATTACHMENT FOR SOLAR TRANSITS.
(Application filed Nov. 30, 1901.)
(No Model.)
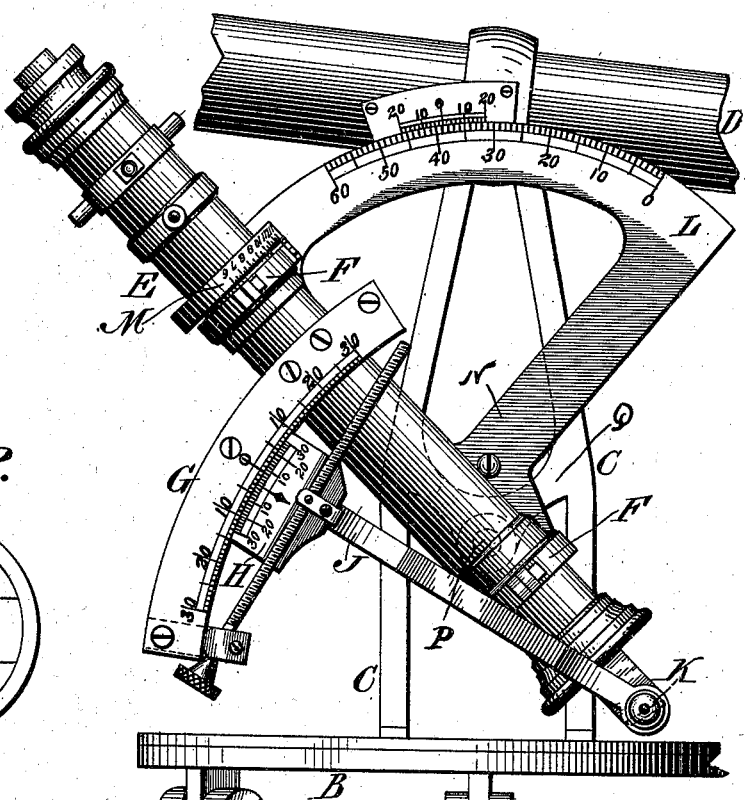
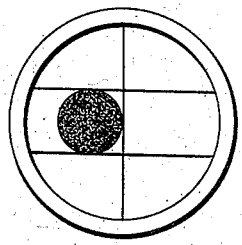
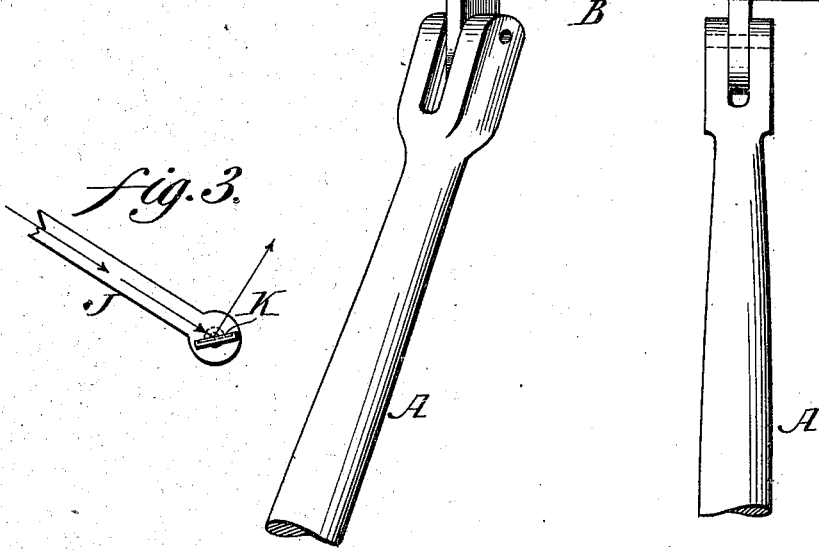

UNITED STATES PATENT OFFICE.

JAMES H. YOUNG, OF PENSAUKEN, NEW JERSEY, ASSIGNOR TO ALFRED C. YOUNG, OF PHILADELPHIA, PENNSYLVANIA.

MERIDIAN ATTACHMENT FOR SOLAR TRANSITS.

SPECIFICATION forming part of Letters Patent No. 709,289, dated September 16, 1902.

Application filed November 30, 1901. Serial No. 84,217. (No model.)

*To all whom it may concern:*

Be it known that I, JAMES H. YOUNG, a citizen of the United States, residing in Pensauken, in the county of Camden, State of New Jersey, have invented a new and useful Improvement in Meridian Attachments to Solar Transits, of which the following is a specification.

My invention relates to an improvement in meridian attachments to solar transits; and it consists in mounting a solar telescope in suitable collars which are secured to a suitable plate, which latter is pivoted between the standards which support the telescope and having a latitude-arc connected therewith in the form of a quadrant and a declination-arc suitably connected with said telescope at a point between the supports and which is adapted to revolve in a plane outside of the plane of said standards.

I am aware that a telescope provided with a reflector and declination-arc attached to a latitude-arc and revolving in collars as a part of a meridian attachment is not in itself new; but the conformation of the latitude-arc as heretofore used made it necessarily small in radius and the graduations thereon difficult to read and would not permit an increase in the radius of the arcs without a material increase in the weight and bulk of the meridian attachment.

Figure 1 represents a side elevation of a portion of a transit and a telescope and arcs attached thereto embodying my invention. Fig. 2 represents the appearance of the sun in the field of view of the telescope. Fig. 3 represents a diagrammatic view showing a reflector employed in front of the object-glass of the telescope.

Similar letters of reference indicate corresponding parts in the figures.

Referring to the drawings, A designates the feet supporting the usual plate B of a transit from which arises the standards C, which carry the telescope D.

E designates a solar telescope revolving in suitable collars F, which are properly supported, being mounted on a plate N, which is pivoted at P to a bar Q, whereby the telescope E can be rotated independent of the telescope D, said bar Q forming part of or secured to the standard C, substantially at an equal distance therebetween, it being further noted that the pivotal point P is situated between said collars F, whereby a strong and durable structure results and the weight being equally distributed prevents improper movement of the parts.

G designates a declination-arc, which is secured to the side of the telescope E, between the collars F, and is provided with a vernier H, which is carried by an arm J, which turns on a suitable axis beyond the object-glass end of the telescope E and extends therefrom toward the eyepiece of the said telescope, and thus the vernier moves in a plane between the collars F, a reflector K being carried thereby which is turned on its axis in front of the object-glass of the telescope.

L designates a latitude-arc having a horizontal axis which is suitably supported, being secured to or forming part of said plate N, and which arc is in the form of a quadrant, it being seen that the axis of the arm J is within a circle the center of which is the center of the quadrant or latitude-arc L, it being further noted that the said telescope E can revolve and carries with it the declination-arc G, which moves in a plane outside of the plane of said standards C. Suitable screws give slow motion to the various parts.

M designates an hour-arc which is suitably secured to the tube of the telescope E, the indicator or pointer being attached to one of the collars in which the telescope revolves.

It will be further seen that by reason of the construction as presented the latitude-arc is increased in size, whereby the radius is increased and the graduations on the said arc are more legible, and the declination-arc is also increased, whereby the graduations are larger and are thus more legible, thereby increasing the efficiency of the attachment without increasing the weight or bulk. It will be further seen that by reason of the construction as presented the solar transit is adapted to revolve in collars which are pivoted to a plate, the latter being suitably pivoted at a point between the standards which support the transit and in substantially a line with the axis of support of said telescope, and that the declination-arc is attached to said solar telescope at a point between the collars, whereby it will be seen that the construction is one tending to prevent improper movement of the parts, since the same are properly balanced, and that the compactness of the device and the ease of operation of the same is increased.

It will be evident that by reason of the shape of the latitude-arc the solar telescope is attached thereto in such position as to bring the solar reflector near the center of the arc, thereby permitting the declination-arc to be revolved, as above stated.

To determine true meridian with this instrument, set off the latitude and declination and the hour arc to the approximate time the sun can generally be brought into the field of view by simply revolving the transit on its vertical axis. The transit being clamped, the sun may be brought accurately between the equatorial wires with the tangent-screws, at which time the solar telescope and also the transit telescope parallel to it will be in the plane of the meridian.

It will be evident that various changes may be made by those skilled in the art which will come within the scope of my invention, and I do not, therefore, desire to be limited in every instance to the exact construction herein shown and described.

Having thus described my invention, what I claim as new, and desire to secure by Letters Patent, is—

1. In a solar transit, a telescope, standards supporting the same, a solar telescope suitably pivoted at a point between said standards and moving independently of said first-mentioned telescope, a latitude-arc in the form of a quadrant connected and moving with said solar telescope, and a declination-arc suitably connected with said solar telescope and adapted to revolve in a plane outside of the plane of said standards.

2. In a solar transit, a telescope, standards supporting the same, a plate pivoted at a point between said standards, collars on said plate on opposite sides of the pivotal point of said plate, a solar telescope revoluble in said collars, a latitude-arc connected with said plate, and a declination-arc and vernier on said solar telescope between said collars, whereby the weight thereof will be distributed equally and improper operation of the parts will be obviated.

JAMES H. YOUNG.

Witnesses:
WM. CANER WIEDERSHEIM,
JOHN A. WIEDERSHEIM.